United States Patent [19]

Visco et al.

[11] Patent Number: 5,516,598
[45] Date of Patent: May 14, 1996

[54] SECONDARY CELL USING ORGANOSULFUR/METAL CHARGE TRANSFER MATERIALS AS POSITIVE ELECTRODE

[75] Inventors: Steven J. Visco; Jiro K. Takemoto, both of Berkeley; May-Ying Chu, Oakland, all of Calif.

[73] Assignee: Polyplus Battery Company, Inc., Berkeley, Calif.

[21] Appl. No.: 281,919

[22] Filed: Jul. 28, 1994

[51] Int. Cl.$^6$ .................................................. H01M 4/86
[52] U.S. Cl. .......................... 429/42; 429/101; 429/104; 429/105; 429/106; 429/107; 429/212; 429/213; 429/218
[58] Field of Search .................. 429/42, 101, 104, 429/105, 106, 107, 212, 213, 218

[56] References Cited

U.S. PATENT DOCUMENTS

| | | | |
|---|---|---|---|
| 4,111,857 | 9/1978 | Engler et al. | 528/226 |
| 4,181,779 | 1/1980 | Teo | 429/199 |
| 4,833,048 | 5/1989 | DeJonghe et al. | 429/104 |
| 4,917,974 | 4/1990 | DeJonghe et al. | 429/104 |
| 5,162,175 | 11/1992 | Visco et al. | 429/192 |
| 5,348,819 | 9/1994 | Uemachi et al. | 429/104 |

OTHER PUBLICATIONS

Dahm et al. "Preparation and Physical Properties of Highly Conducting Metal (M=Ni, Co, Cu) Coordination Polymers," *Synthetic Metals*, 55–57: 884–889 (1993).

Dirk et al., "Metal Poly(benzodithiolenes)," *Macromolecules*, 19(2):266–269 (1986).

Liu et al., "Novel Solid Redox Polymerization Electrodes—All–Solid–State, Thin–Film, Rechargeable Lithium Batteries," *J. Electrochem. Soc.*, 138(7): 1891–1895 (Jul. 1991).

Liu et al., "Novel Solid Redox Polymerization Electrodes—Electrochemical Properties," *J. Electrochem. Soc.*, 138(7): 1896–1900 (Jul. 1991).

MacDiarmid et al., "The Aqueous and Non–Aqueous Electrochemistry of Polyacetylene: Application in High Power Density Rechargeable Batteries," *Journal DePhysique*, 44 (Colloque C3; suppl. 6): 543–550 (Jun. 1983).

Sato et al., "A Mechanism of Lithium Storage in Disordered Carbons," *Science* 264: 556–558 (Apr. 22, 1994).

Sawyer et al., "Redox Chemistry and Spectroscopy of Toluene–3,4–dithiol (TDTH$_2$) and of Its M(TDT)$_2^{2-/-}$ Complexes and Zinc(II), Copper(II), Nickel(II), Cobalt(II), Iron(II), and Manganese(II). Formation of a Stable d$^n$—(• SR) Bond upon Oxidation by One Electron," *J. Am. Chem. Soc.*, 108: 936–942 (1986).

Vicente and Ribas, "Synthesis, Characterization and Properties of Highly Conducting Organometallic Polymers Derived from the Ethylene Tetrathiolate Anion," *Synthetic Metals*, 13: 265–280 (1986).

Vicente and Ribas, "Unexpected Mononuclear Metal Complexes Derived from 1,3,4,6-Tetrathiapentalene-2,5-Diode," *Nouveau Journal De Chimie*, 8(11): 653–658 (1984).

Visco et al., "Solid Redox Polymerization Electrodes and Their Use in All–Solid–State Batteries," *Mol. Cryst. Liq. Cryst.*, 190: 185–195 (1990).

Williams et al., "The Toluenedithiolate and Maleonitriledithiolate Square–Matrix Systems," *J. Am. Chem. Soc.*, 88(1): 43–50 (Jan. 5, 1966).

*Primary Examiner*—Bruce F. Bell
*Attorney, Agent, or Firm*—Leona L. Lauder

[57] ABSTRACT

A novel battery cell is disclosed which is characterized by a metal-organosulfur positive electrode which has one or more metal-sulfur bonds wherein when the positive electrode is charged and discharged, the formal oxidation state of the metal is changed. The positive electrode has the general formula $$(M'^{z+}{}_{(c/z)}[M_q(RS_y)_x{}^{c-}])_n$$

wherein z=1 or 2; y=1 to 20; x=1 to 10; c=0 to 10; n≧1; and q=1 to 10;

wherein M' is a metal or other cation;

wherein M is any multivalent metal, and when n is >1, can be a different multivalent metal in different repeat units of the polymeric metal-organosulfur materials;

wherein R is an organic group having 1 to 20 carbon atoms comprising one or more organic moieties selected from the group consisting of aliphatic chains, aromatic rings, alicyclic rings and combinations of aliphatic chains, aromatic rings, and alicyclic rings, with the proviso that R does not comprise fused aromatic rings; wherein said aliphatic chains, aromatic and alicyclic rings may include one or more oxygen, sulfur, silicon, phosphorous or nitrogen heteroatoms, and which may be substituted with one or more electron withdrawing groups; and wherein each aliphatic chain may be linear or branched, saturated or unsaturated; and wherein when n>1, R can be different in different repeat units of the polymeric materials. Gel, solid-state and liquid batteries using said novel positive electrode are also disclosed.

20 Claims, 3 Drawing Sheets

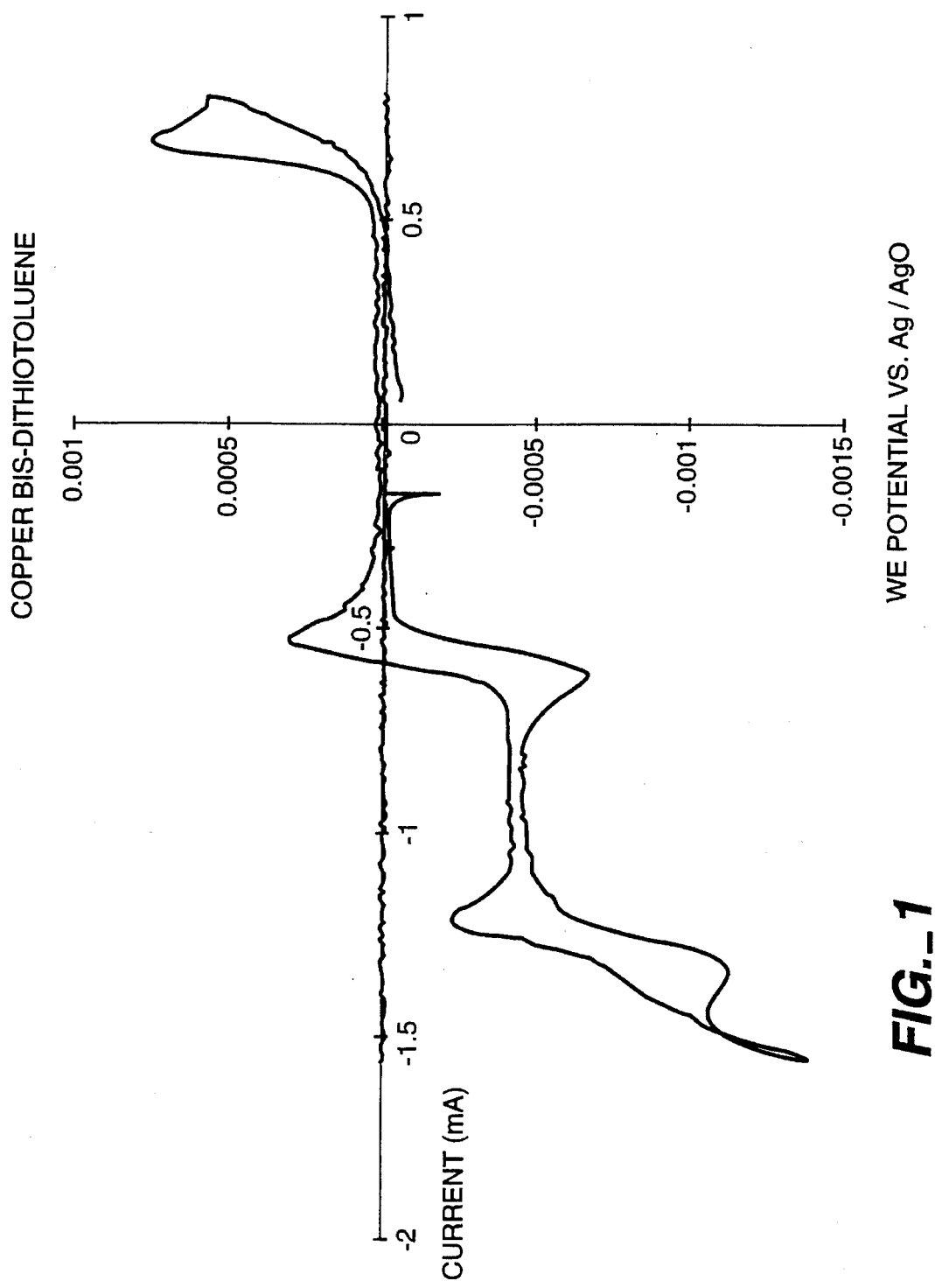
FIG._1

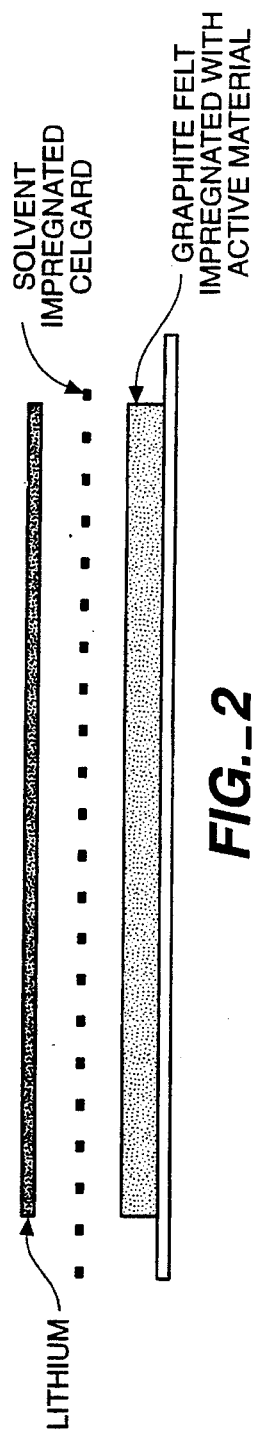
FIG._2
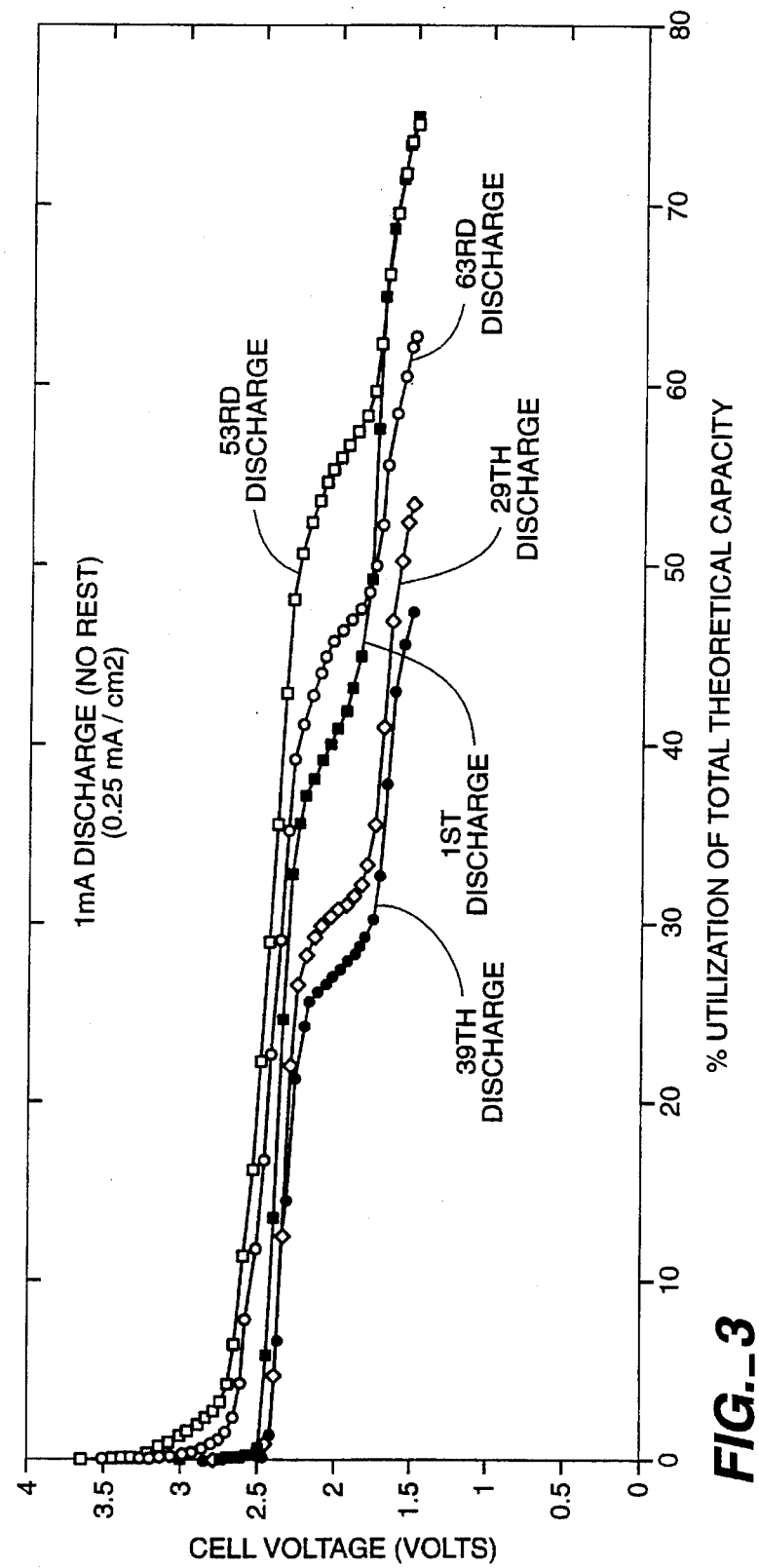
FIG._3

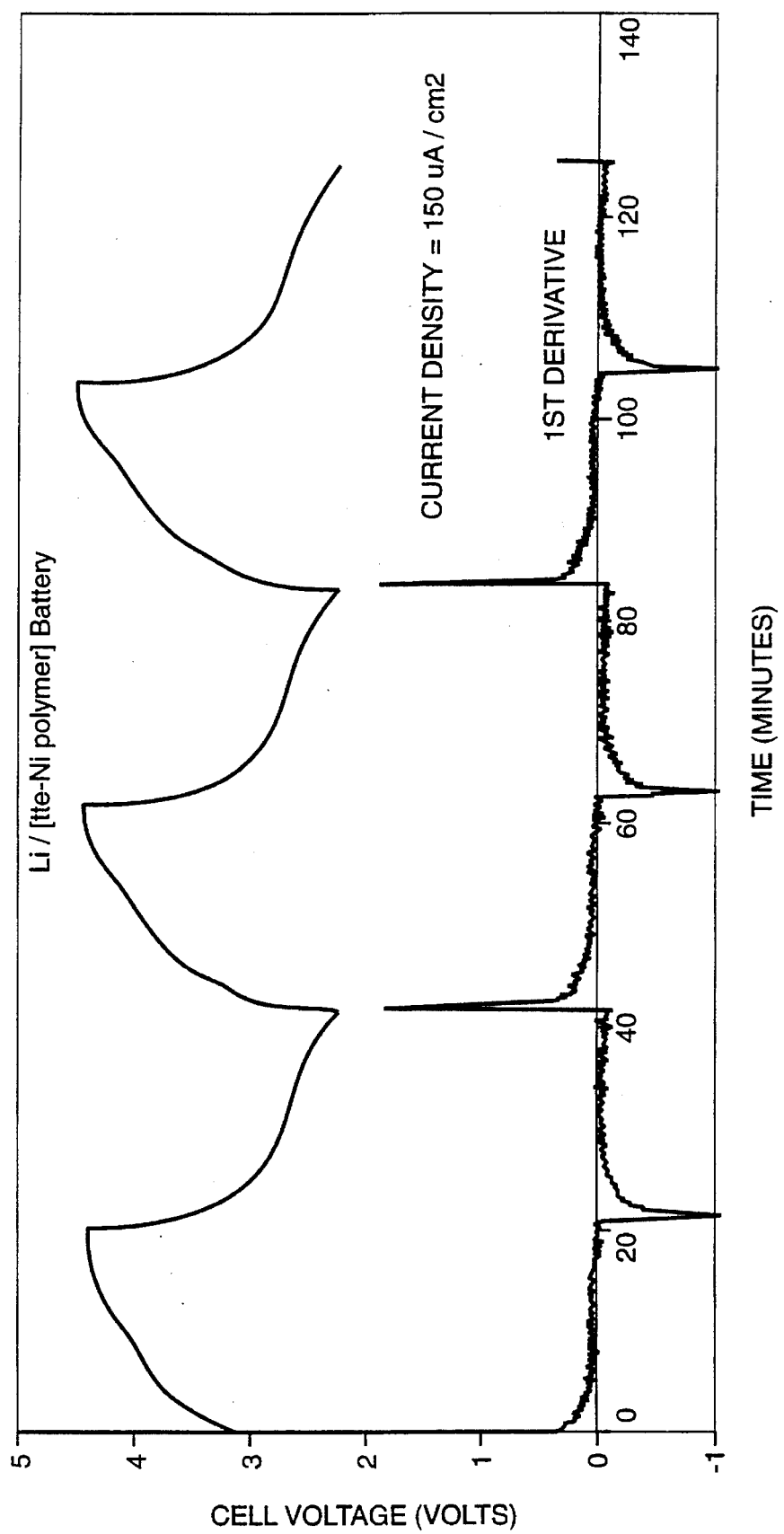
FIG._4

SECONDARY CELL USING ORGANOSULFUR/METAL CHARGE TRANSFER MATERIALS AS POSITIVE ELECTRODE

TECHNICAL FIELD

This invention relates generally to battery cells having electrodes based on metal/organosulfur charge transfer materials, more preferably transition metal/organosulfur charge transfer materials. The battery cells are preferably rechargeable. Various electrodes such as alkali metal, transition metal, intercalation or insertion compounds, can be coupled with the invention to provide high gravimetric and volumetric energy density cells.

BACKGROUND OF THE INVENTION

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for rechargeable batteries having high specific energies (light weight). Mounting concerns regarding the environmental impact of throwaway technologies, has caused a discernible shift away from primary batteries and towards rechargeable systems.

In addition, heightened awareness concerning toxic waste has motivated efforts to replace toxic cadmium electrodes in nickel/cadmium batteries with the more benign hydrogen storage electrodes in nickel/metal hydride cells. For the above reasons, there is tremendous market potential for environmentally benign secondary battery technologies.

Several approaches have been pursued in an effort to develop improved secondary battery technologies, including the recent introduction of the nickel/metal hydride cell and the commercialization of lithium-ion technologies. Among the factors leading to the successful development of high energy density batteries, is the fundamental need for high voltage and/or low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

It has been found previously that organodisulfide compounds can be used as high energy density electrodes for rechargeable battery systems. In the work by Liu et al. [Liu et al., *J. Electrochem. Soc.*, 138: 1891 (1991); Liu et al., *J. Electrochem. Soc.*, 138: 1896 (1991); Visco et al., *Mol. Cryst. Lig. Cryst.* 190: 185 (1990); and Visco et al., U.S. Pat. No. 5,162,175 (issued Nov. 10, 1992)], a novel class of polymeric organodisulfides were described having exceptionally low equivalent weights and consequently very high gravimetric and good volumetric capacities. The electrochemical reaction involves the oxidation of a thiolate anion to a sulfur radical which rapidly dimerizes to form a disulfide linkage as shown below:

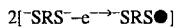

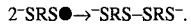

Those reactions lead ultimately to the formation of a polymeric organodisulfide.

In the preferred embodiment, the polyorgano-disulfides (PDS) were used as positive electrodes in thin-film polymer electrolyte cells having alkali metal negative electrodes. [See, Visco et al., U.S. Pat. No. 5,162,175.] Since organodisulfides are invariably electronic insulators, carbon black was included in the electrode formulation. The PDS were formulated as an intimate mixture of the disulfide, solid polymer electrolyte (SPE), and carbon black. Although the intermediate temperature performance (60° C. to 120° C.) of the alkali metal solid polymer batteries having PDS cathodes is excellent, utilization of positive electrode capacity can be critically dependent on the intimate connection between the carbon black particles, PDS particles, and current collectors. That interconnectivity appears to be more important as the temperature of operation is reduced to ambient and subambient temperatures.

The instant invention provides a means to overcome the temperature range limitations of the Liu et al. PDS electrodes. The need for a high degree of interconnectivity between and among the carbon black, PDS matrix, and current collectors of the Liu et al. PDS electrodes is eliminated or minimized according to the instant invention by the introduction of metallic conductivity into the polyorganodisulfide polymer chain.

Metallic conductivity and low temperature superconductivity has been reported for inorganic polymers such as $(SN)_x$, and synmetals such as tetracyano-p-quinodimethane-tetrathiafulvalene (TCNQ-TTF) since the early 1970s. In the mid-1970s considerable attention was directed towards the study of organic polymers following the discovery that polyacetylene could be prepared as a film having metallic luster.

In the late 1970s it was found that the conductivity of polyacetylene could be increased 13 orders of magnitude by doping it with various donor or acceptor species, reaching conductivities of $10^3$ S·cm$^{-1}$. It was later proposed by Heeger and MacDiarmid [MacDiarmid et al., *J. Phys. Collog.* 44: C3-543 (1983)] to use such materials as electrodes in secondary batteries. Unfortunately, with few exceptions, conducting polymers such as doped polyacetylene tend to be air sensitive, difficult to process, and have very low volumetric capacities. For those reasons, most groups have abandoned conducting polymers for battery applications.

Recently, highly conducting metallo-organic and/or coordination polymers have been reported which exhibit exceptionally good electrical properties and environmental stability, as well as multiple oxidation states. For example, tetrathiolate ligands can be reacted with transition metal salts (see reaction set forth below) to yield black amorphous coordination polymers with exceptionally high electrical conductivity and environmental stability [Dahm et al., *Synthetic Metals*, 55–77: 884–889 (1993)]. Such materials have achieved electrical conductivities of $10^2$ S·cm$^{-1}$.

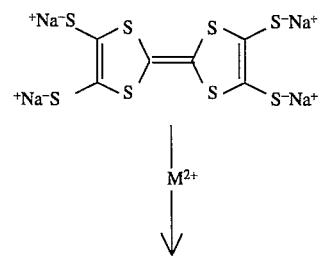

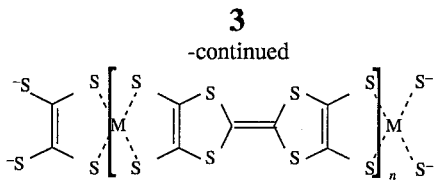

-continued

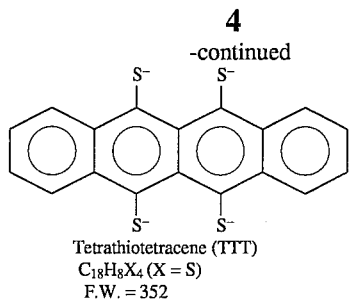

Tetrathiotetracene (TTT)
$C_{18}H_8X_4$ (X = S)
F.W. = 352

The instant invention concerns the use of metallo-organic charge-transfer materials as positive electrodes in secondary batteries. Some metal oxides and chalcogenides presently used as battery electrodes have appreciable electrical conductivities; however, many such oxide/chalcogenide materials need to be formulated with carbon black to increase the conductivity of the composite electrode to acceptable levels. In contrast, the inherently high electrical conductivity of charge-transfer materials allows them to be used without significant dilution.

The metallo-organic charge-transfer materials of this invention are essentially redox electrodes and in principle are reversible to an enormous variety of counter electrodes. Oxide/chalcogenide cathode materials presently under investigation by other groups are not reversible to alkali metal ions other than lithium, and thus, lack the flexibility of the electrodes of the instant invention.

The reversibility of the electrodes of the instant invention can furnish large economic advantages in the commercialization of secondary batteries based on charge-transfer materials, in that expensive lithium anodes can be replaced by inexpensive sodium electrodes. Also, the ability to alter the thermodynamic redox potential of the charge-transfer electrode by a suitable choice of the metal ion and/or of the organosulfur chelating ion provides tremendous flexibility in tailoring the secondary battery characteristics to the specific application at hand.

Teo [U.S. Pat. No. 4,181,779 (issued on Jan. 1, 1980)] describes the use of halogen reactive materials such as organo-metallic polymers limited to the nominal stoichiometry $[M(TTL)]_x$ in which M is a transition metal containing complex having at least one transition metal ion selected from Group VIII of the periodic table; wherein TTL has the nominal atom composition $C_{10}H_4X_4$ and substituted compositions thereof in which X is selected from the group consisting of sulfur (S), selenium (Se), tellurium (Te), and mixtures thereof; and x is equal to or greater than 1. The TTL compounds described by Teo have high formula weights, for example, as shown below, leading to unattractive energy densities (watthours/kilogram) for electrodes formulated with such materials.

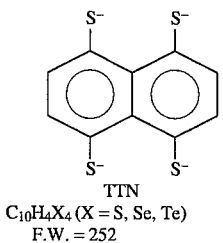

TTN
$C_{10}H_4X_4$ (X = S, Se, Te)
F.W. = 252

In contrast to the Teo electrodes, the electrodes of the instant invention have low equivalent weights and consequently high energy densities.

A key feature of the electrodes of the instant invention is the use of thiolate ligands to chelate metal ions of the electrodes and thereby form coordination polymers having low equivalent weights and enhanced electrical conductivity. The chelation also solves a prior art dissolution problem of the PDS electrodes. For example, thiolate anions from the PDS electrodes most notably in a liquid or gel format, diffuse and migrate to the negative electrode, which may result in deterioration of battery performance. In accordance with the instant invention, the metal-organosulfur polymers are anchored by chelation and locked into position.

The new metal-organosulfur positive electrodes of this invention, thus, overcome as indicated above many of the problems found in prior art battery systems. The invention provides for novel secondary batteries that have high electrical conductivity, high energy densities and polymeric positive electrodes that are stably situated. Further, the secondary cells of this invention represent improvements over prior art batteries in having more cycle life and in being able to perform at a lower temperature without deterioration of performance.

SUMMARY OF THE INVENTION

Therefore, it is a primary object of the invention to provide a secondary battery cell that has a low equivalent weight and consequently high energy density, and operates in a wide range of operating temperatures including ambient and sub-ambient temperatures. The secondary batteries of this invention comprise a novel positive electrode comprising a metal-organosulfur material, preferably a transition metal-organosulfur material of relatively low equivalent weight. The redox positive electrode is preferably polymeric, wherein the term "polymeric" is defined herein to include copolymeric embodiments.

The positive electrode works in any standard battery format—broadly classified herein as liquid, gel and solid-state. The novel positive electrode has great flexibility, working with a wide variety of counter electrodes, is not air sensitive, and is easy to process. It does not require an electrically conductive material, such as, carbon black or equivalent conductor particles, for successful performance, although such an additive can be used and may be preferred for certain applications.

The novel positive electrodes of this invention comprise metal-organosulfur materials having the general formula

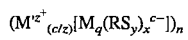

wherein z=1 or 2; y=1 to 20; x=1 to 10; c=0 to 10; n≧1; and q=1 to 10;

wherein M' is a metal or other cation;

wherein M is any multivalent metal, and when n is >1, can be a different multivalent metal in different repeat units, that is, in different monomers of the polymeric metal-organosulfur materials;

wherein R is an organic group having 1 to 20 carbon atoms comprising one or more organic moieties selected from the group consisting of aliphatic chains, aromatic rings, alicyclic rings and combinations of aliphatic chains, aromatic rings, and alicylic rings, with the proviso that R does not comprise fused aromatic rings; wherein said aliphatic chains, aromatic and alicyclic rings may include one or more oxygen, sulfur, silicon, phosphorous or nitrogen heteroatoms, and may be substituted with one or more electron withdrawing groups; and wherein each aliphatic chain may be linear or branched, saturated or unsaturated; and wherein when n>1, R can be different in different repeat units of the polymeric materials.

Thus, as the general formula for the positive electrodes of this invention indicates to those of skill in the art, the positive electrodes of this invention can be copolymeric in that M and/or R can differ from one polymeric repeat unit to another in either an alternating, block, or random fashion, and consequently the values of y (that is, the number of sulfur atoms attached to R), c, and/or z may also differ among the repeat units of the copolymeric embodiments of the metal-organosulfur materials of this invention. However, preferably the same multivalent metal M and organic group R would predominate in the polymeric monomers of this invention, and depending on the application, it may be preferred to have the same M and R throughout the polymeric positive electrode materials of this invention. Further, polymers of this invention may comprise as M' other cations as dopants in trace amounts, for example, tetra-alkyl ammonium cations and divalent metal cations, which may be in some instances heavier than the preferred alkali metal cations.

Preferred for the novel positive electrodes of the instant invention are those metal-organosulfur materials having the above general formula wherein $y=2-10$, more preferably $y=2-8$, still more preferably $y=4-8$, and even more preferably $y=4-6$. The preferences for y, as the number of sulfurs bound to R, depends upon the number of carbons present in R. In general, it is preferred that the ratio of sulfurs to carbons be high.

Preferably in the above formula, R contains from two to twelve carbons, more preferably from two to eight carbons, and still more preferably from two to six carbons. Preferred $(RS_y)$ groups are, for example, tetrathioethylene, benzene-1,2,4,5-tetrathiolate (BTT), hexathiobenzene, and cyclooctatetraenes substituted with from one to eight sulfurs, preferably with eight sulfurs.

Preferred electron withdrawing groups on R include $NO_2$, $CF_3$, $SO_3$ and halogen groups. More preferably, those electron withdrawing groups are halogens.

Preferably n in the above general formula is in the range of 1 to 100,000, more preferably 2 to 5,000, and still more preferably 4 to 50.

Preferably, q is only greater than 1 when $y \geq 6$. In general, q is preferably 1 to 3, and more preferably 1.

Preferably, z is 1 when, for example, M is lithium (Li) or sodium (Na). Depending upon the formal oxidation state of M, z and y, c varies.

Preferably, x in the above general formula is 1 to 4; and still more preferably x is 1.

M' in the above formula is preferably a metal cation, more preferably an alkali metal cation or alkaline earth metal cation, still more preferably an alkali metal cation. Even more preferably, M' is $Li^+$, $Na^+$ or potassium ($K^+$), and even more preferably $Li^+$ or $Na^+$.

Preferred multivalent metals for M according to this invention are chosen preferably from transition metals or alkaline earth metals as defined below under Definitions. Of the alkaline earth metals, magnesium (Mg) and beryllium (Be) are preferred. Of the transition metals, preferred are non-toxic transition metals which excludes such metals as chromium (Cr), cadmium (Cd), gallium (Ga), germanium (Ge), mercury (Hg) among other toxic transition metals. Further preferred are tin (Sn), lead (Pb), aluminum (Al) and the first row non-toxic transition elements: scandium (Sc), titanium (Ti), vanadium (V), manganese (Mn), iron (Fe), cobalt (Co), nickel (Ni), copper (Cu), and zinc (Zn). More preferred are the first row non-toxic transition elements. Still more preferred are manganese (Mn), iron (Fe), cobalt (Co), nickel (Ni), and copper (Cu). Even more preferred are manganese (Mn), iron (Fe), and copper (Cu). Most preferred is iron (Fe) because of its non-toxicity and abundance.

As indicated above, M can differ among the repeat units in an alternating, random, or block manner. Preferably, two or more of the preferred non-toxic first row transiton metals would be selected for such copolymeric embodiments of this invention. More preferably, for such copolymers, two or more of Fe, Mn, Co, Ni and Cu would be selected, more preferably two or more of Fe, Mn and Cu. Further, for certain applications, trace amounts of multivalent metals in weight percentages>0 and less than 2 may be included in the polymeric materials of this invention.

It will be recognized by those of skill in the art that the nature of R will affect both the physicochemical properties of the resulting positive electrode, e.g., the melting point, etc., as well as the electrochemical properties, (redox potential) of the molecule. For example, the presence of electron withdrawing groups will have an effect upon any —S—S— bonds that could form, for example, between different monomer units, increasing the oxidizing character of the organic compound and probably increasing the dielectric constant as well.

By way of example, and not of limitation, R, when it comprises a straight or branched aliphatic chain, may comprise an alkyl, alkenyl, alkynyl, alkoxyalkyl, alkylthioalkyl, or aminoalkyl group, including substituted derivatives of such groups. When R comprises an aromatic group, the group may comprise an aryl, aralkyl, or alkylaryl, including substituted derivatives, and the ring may also contain one or more nitrogen, sulfur, oxygen, phosphorous or silicon heteroatoms in the ring as well. Generally speaking, any organic group (with the noted proviso) may be used to form the metal-organosulfur compound of the positive electrode provided that the resulting compound is thermally stable, i.e., does not decompose at the operating temperature; and that the compound exhibits satisfactory voltage properties.

If the oxidation state of M should exceed the sum of the negative charges on the sulfur of the metal-organosulfur materials, that positive charge will be balanced by appropriate anions, such as, for example, with copper perchlorate or nitrate salts.

BRIEF DESCRIPTION OF FIGURES

FIG. 1 provides voltammograms wherein the product of Example 1 $[(n-C_4H_9)_4N]^{1+}[Cu(tdt)_2]^{1-}$ was used as the positive electrode versus a silver/silver oxide (Ag/AgO) reference and counter electrode.

FIG. 2 provides a schematic of a Li/Celgard™/[Cu complex] cell. [Celgard is a microporous polymer membrane commercially available from Hoechst Celanese Corporation (13800 South Lakes Drive, Charlotte, N.C. 28273, USA).]

FIG. 3 illustrates the cycling performance of the lithium cell shown in FIG. 2 wherein the positive electrode is $[(n-C_4H_9)_4N]^{1+}[Cu(tdt)_2]^{1-}$.

FIG. 4 illustrates the reversible cycling of a Li/Celgard™/ Ni complex cell according to Example 2 at a current density of 150 µA/cm².

ABBREVIATIONS acac—acetylacetonate
BTT—benzene-1,2,4,5-tetrathiolate
cm—centimeter
DMT—3,4-dimercaptotoluene
EPDM—ethylene propylene diene monomer
E.W.—equivalent weight
F.W.—formula weight
GICs—graphite intercalation compounds
MOSM—metal—organosulfur charge transfer material
PDS—polyorganodisulfides
P.E.D.—practical energy density
PPP—poly (p-phenylene)
PVC—polyvinyl chloride
PVDF—polyvinylidene fluoride
S—siemens or sulfur depending on context
SPE—solid polymer electrolyte
TBA—tetrabutyl ammonium ion
TCNQ-TTF—tetracyano-p-quinodimethane-tetrathiafulvalene
tdt—toluene-3,4-dithiol
T.E.D.—theoretical energy density
TPD—1,3,4,6-tetrathiapentalene-2,5-dione
tte—tetrathioethylene
TTF-TT—tetrathiafulvalene-tetrathiolate
TTN—tetrathionaphthalene
TTT—tetrathiotetracene
WE—working electrode
Wh/kg—watthours per kilogram

DETAILED DESCRIPTION

The novel metal/metal-organosulfur secondary cells of this invention comprise metal-organosulfur positive electrode materials which are characterized by one or more metal-sulfur bonds, wherein the organic groups do not comprise fused aromatic rings, and wherein when the positive electrode is charged and discharged, the formal oxidation state of the metal is changed.

Metal-organosulfur positive electrode materials of this invention which are polymeric and include sulfur atoms not directly linked to the metal of a polymeric repeat unit, may further be characterized in that upon charge and discharge of the positive electrode, sulfur-sulfur disulfide bridges may be formed or broken intramolecularly and/or intermolecularly, wherein the intramolecular disulfide bridges do not form between the sulfurs of the metal-sulfur bonds.

The general formula for the metal-organosulfur materials of the positive electrodes of this invention is shown above in the Summary of the Invention. As indicated above, a key feature of the electrodes of the instant invention is the use of thiolate ligands to chelate metal ions of the preferably polymeric electrodes. In a preferred embodiment, the chelating ligand would be a simple tetrathiolate salt, such as $C_2S_4^{4-}$,

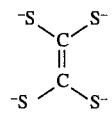

The synthesis of such salts is known to those skilled in the art. [See, for example, Vincente et al., *Nouveau Journal de Chimie*, 8(11): 653 (1984); Engler et al., U.S. Pat. No. 4,111,857 (issued on Sep. 5, 1978); and Poleschner et al., *Z. Chem.*, 18: 345–346 (1978).]. In the spirit of the solid redox polymerization electrodes, such tetasulfides could be used by themselves as redox electrodes,

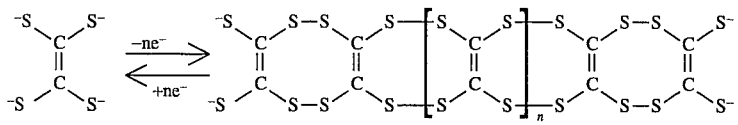

as set forth in Visco et al., U.S. Pat. No. 5,162,175, and De Jonghe et al., U.S. Pat. No. 4,833,048.

The equivalent weight of the tetrathiolate salt used in that type of redox reaction is 38 grams/equivalent, leading to a theoretical energy density of 1200 Wh/kg for a lithium cell having a mean voltage of 2.0 volts. Such an exceedingly high specific energy density is attractive. However, for ambient temperature applications where gelled organic solvents are used as the electrolyte, significant diffusion and migration of the thiolate anions to the lithium electrode can lead to deterioration of cell performance. A solution to that problem according to this invention is the formation of coordination compounds and/or polymers where a metal salt is complexed with the organothiolate anions. The above tetrathiolate salt can be complexed with a metal salt such as $CuCl_2$ to give a charge-transfer coordination polymer as shown below.

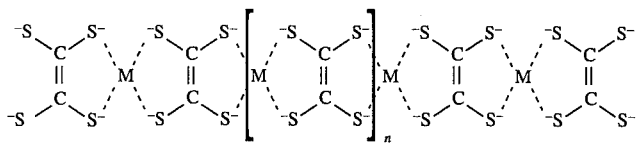

In the case where M is Cu and the polymer can reversibly undergo a 2-electron redox per monomer unit, the equivalent weight of the electrode material is approximately 108 grams/ equivalent, which translates to a theoretical energy density of about 580 Wh/kg for a lithium battery having a mean voltage of approximately 2.5 volts. In the case where the monomer units exhibit larger than 2 electron reversibility, or a higher mean voltage, the theoretical energy densities will be accordingly higher.

The electrochemistry of the metal-thiolates is accurately described as ligand centered. Oxidation of the complex leads to the formation of sulfur radicals which in the absence of the metal ion would dimerize to disulfides. The presence of free d-electrons on the metal ion leads to the formation of a sulfur radical/d-electron radical covalent bond [Sawyer et al., *J. Am. Chem. Soc.*, 108: 936–942 (1986)].

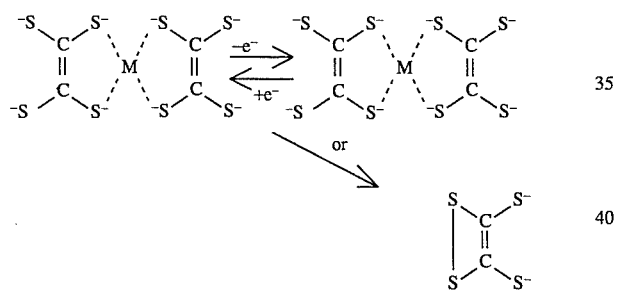

In the absence of free d-electrons, the thiolate anions dimerize and the complex is broken down. That is illustrated by the electrochemical irreversibility of $Zn^{II}$ tetrathiolate complexes, where the $Zn^{II}$ ($d^{10}$) metal ion lacks free d electrons. Oxidation of the $Zn^{II}$ complex leads to formation of the disulfide as shown above. It has been reported that the degree of stabilization and $M^{II}$●—●S bond strength of the metal-thiolate complexes increases as the oxidation potential of the complex becomes more negative [Sawyer et al., supra.] On this basis, the order of $M^{II}$●—●S bond strength is Fe>Co>Mn>Cu>Ni.

In addition to the accessibility of multiple oxidation states of the metallo-organosulfur compounds, extensive electron delocalization leads to semi-conducting or metallic properties of the complexes. The high electronic conductivity of these materials should facilitate utilization of the redox polymers in composite electrode formulations. Metallic conductivity has been reported for a variety of metal tetrathiolate coordination polymers [Dahm et al., supra]. For the benzene-1,2,4,5-tetrathiolate (BTT) ligand (below), the nickel coordination polymer was reported to have a room temperature conductivity of $\sigma=2.7$ S·cm$^{-1}$.

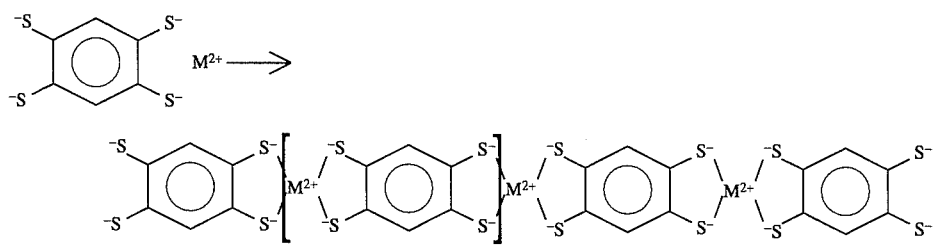

The above coordination polymers would also possess low equivalent weights for various complexes with 1st row transition metals. The properties of low equivalent weight and high electronic conductivity are desirable for battery applications. Further improvements in energy density might be realized through the ability to form disulfide linkages at other sites on the chelating ligand as shown schematically below.

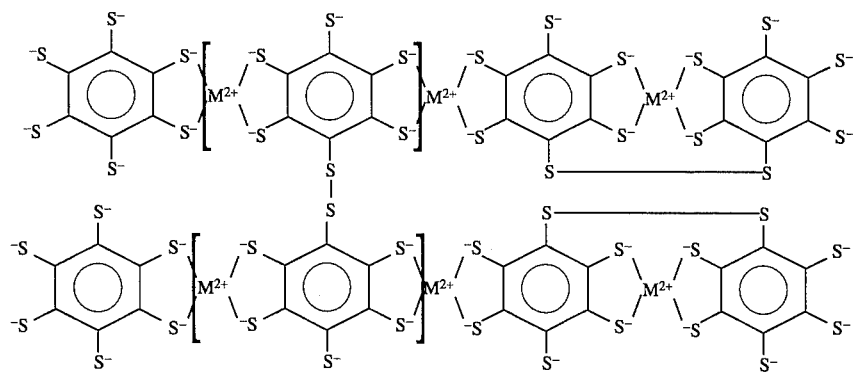

For the above example, if a copper coordination polymer undergoes a 2 e⁻ redox reaction plus 1 e⁻ at each disulfide linkage, the equivalent weight becomes [(12×6)+ (6×32)+ 63.5]/4=327.5/4=81.8 grams/equivalent. If the nominal voltage of this redox material is 2.5 volts vs. lithium, the theoretical energy density of a lithium cell based on this cathode would be 750 Wh/kg. If the coordination polymer can reversibly undergo more than a 2 e⁻ change per monomer unit, the energy density will be accordingly higher.

An exemplary linear embodiment of the general formula for the positive electrodes of this invention, shown above in the Summary of the Invention, might look as shown below

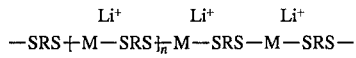

For the above representative embodiment, M is formally in the $1^+$ oxidation state; however, the oxidation state will vary depending on the choice of M. Another representative embodiment could be a more branched network structure, for example, as depicted below:

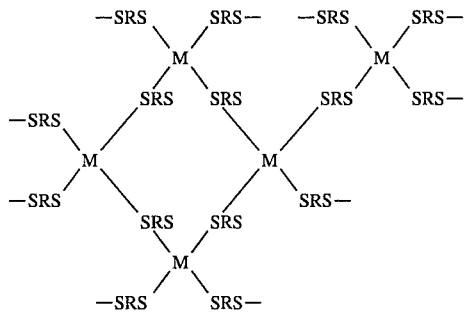

in which case the metal is in a formal oxidation state of $4^+$. A linear form of a compound using tetrathiolate chelates is shown below:

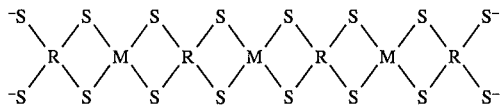

A perspective view of such a hexathiolate chelate is shown below where disulfide bridges are formed, although additional metal-sulfur bridges could also be formed at the appropriate metal/sulfur stoichiometry.

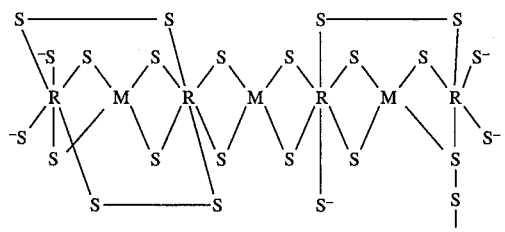

Definitions

"Metals" are defined herein to be elements whose atoms usually lose electrons in the formation of compounds.

The phrase "transition metals" is defined herein to include the following metals:

(1) the scandium family: scandium (Sc), yttrium (Y), lanthanum (La) and the lanthanide series, and actinium (Ac) and the actinide series;

(2) the titanium family: titanium (Ti), zirconium (Zr), and hafnium (Hf);

(3) the vanadium family: vanadium (V), niobium (Nb), and tantalum (Ta);

(4) the chromium family: chromium (Cr), molybdenum (Mo), and tungsten (W);

(5) the manganese family: manganese (Mn), technetium (Tc), and rhenium (Re);

(6) the iron family: iron (Fe), cobalt (Co), and nickel (Ni);

(7) the platinum family: ruthenium (Ru), rhodium (Rh), palladium (Pd), osmium (Os), iridium (Ir), and platinum (Pt);

(8) the copper family: copper (Cu), silver (Ag), and gold (Au);

(9) the zinc family: zinc (Zn), cadmium (Cd), and mercury (Hg);

(10) the aluminum family: aluminum (Al), gallium (Ga), indium (In), and thallium (Tl); and

(11) the germanium family: germanium (Ge), tin (Sn), and lead (Pb).

The first transition series includes: Sc, Ti, V, Cr, Mn, Fe, Co, Ni, Cu, and Zn. The second transition series includes: Y, Zr, Nb, Mo, Tc, Ru, Rh, Pd, Ag and Cd. The third transition series includes La, Hf, Ta, W, Re, Os, Ir, Pt, Au and Hg. Miscellaneous transition metals include: Al, Ga, In, Tl (family IIIA); and Ge, Sn, Pb (family IVA).

The phrase "alkali metals" is herein defined as the alkali family of metals located in Group IA of the periodic table, including lithium (Li), sodium (Na), potassium (K), rubidium (Rb), cesium (Cs) and francium (Fr).

The phrase "alkaline earth family" is herein defined as the Group IIA elements, including beryllium (Be), magnesium (Mg), calcium (Ca), strontium (Sr), barium (Ba) and radium (Ra).

The term "binder" is herein defined in accordance with conventional standards within the art. Representative binders include polyvinylidene fluoride (PVDF), ethylene propylene diene monomer (EPDM), and polyvinyl chloride (Pvc).

Liquid, Gel, and Solid-State Formats

In accordance with this invention, a composite positive electrode and a battery system constructed with said positive electrode are provided. The positive electrode comprises a 1-, 2- or 3-dimensional metal-organosulfur electroactive component, preferably which is polymeric.

Conventional formats are described in the literature, for example, De Jonghe et al., U.S. Pat. No. 4,833,048 and Visco et al., U.S. Pat. No. 5,162,175. Such conventional formats are understood to be herein incorporated by reference.

The positive electrode of this invention can be prepared for each of the battery formats by conventional processes known to those of skill in the art. For example, for a solid-state format, the metal-organosulfur material, polyethylene oxide (PEO) and carbon black can be dissolved or dispersed in acetonitrile, and subsequently the solvent can be evaporated to cast a thin film (for example, from 10 to 200 microns) of a solid composite electrode.

The novel secondary cells of this invention may be constructed by any of the well-known and conventional methods in the art. The negative electrode may be spaced from the positive metal-organosulfur electrode, and both electrodes may be in material contact with an ionically conductive electrolyte. Current collectors contact both the positive and negative electrodes in a conventional manner and permit an electrical current to be drawn by an external circuit.

Suitable battery constructions may be made according to the known art for assembling cell components and cells as desired, and any of the known configurations may be fabricated utilizing the invention. The exact structures will depend primarily upon the intended use for the battery unit.

A general scheme for the novel secondary battery cells of this invention in a solid-state format includes a current collector in contact with the negative electrode and a current collector in contact with the positive electrode, and an electrolyte sandwiched between the negative and positive electrodes. In a typical cell, all of the components will be enclosed in an appropriate casing, for example, plastic, with only the current collectors extending beyond the casing. Thereby, reactive elements, such as sodium or lithium in the negative electrode, as well as other cell elements are protected.

The current collectors can be sheets of conductive material, such as, aluminum or stainless steel, which remain substantially unchanged during discharge and charge of the cell, and which provide current connections to the positive and negative electrodes of the cell. The organosulfur/metal charge transfer material of the positive electrode can be formed onto the current collector, and the entire unit can be pressed together with the electrolyte sandwiched between the electrodes.

In order to provide good electrical conductivity between the positive electrode and a metal container, an electronically conductive matrix of, for example, carbon or aluminum fibers may be used. As illustrated in the examples infra, preferably such materials comprise graphite felt such as, for example, Felt GF-S6, a graphite felt commercially available from the Electrosynthesis Company of East Amherst, N.Y. (USA). Carbon powder may also be used. However, when the positive electrode is to be used in liquid form, fibers are preferred over powders because of the tendency of powders to settle out of the liquid.

The metal-organosulfur material of the novel positive electrodes of this invention may be dispersed in a composite matrix, for example, said metal-organosulfur material can be mixed with a polymer electrolyte (ionically conductive), preferably a polyethylene oxide (PEO), and a electronically conductive additive, for example, carbon black.

The novel metal-organosulfur positive electrode of this invention can be formatted for each of the three classes of batteries—liquid, gel and solid state (vacuum stable). For liquid batteries, the preferred volume percentages of the major components are as follows: from 60% to 95% of the metal-organosulfur charge transfer material (MOSM); from from 0% to 10% binder; and 0% to 10% of an electrically conductive material, such as carbon black. More preferably, those percentages for liquid batteries are: from 70% to 90% of MOSM; from 0% to 5% binder; and from 0% to 5% of an electrically conductive material, such as carbon black. Even more preferably, those percentages for liquid batteries are: from 70% to 80% of MOSM; from 0% to 2% of the binder; and from 0% to about 3% of an electrically conductive material.

For gel batteries, preferred volume percentages of the major components of the novel metal-organosulfur positive electrodes of this invention are: from 30% to 80% of MOSM; from 10% to 50% of gel, and from 0% to 20% of an electrically conductive material, such as carbon black. More preferably, those percentages for gel batteries are: from 50% to 70% of MOSM; from 20% to 40% of gel; and from 0% to 10% of an electrically conductive material.

For solid-state batteries preferred volume percentages of the major components of the novel metal-organosulfur positive electrodes are: from 30% to 60% of MOSM; from 30% to 70% of the electrolyte; and from 8% to 20% of an electrically conductive material, such as carbon black. More preferably, those percentages are: from 30% to 50% of MOSM; from 30% to 50% of the electrolyte; and from 8% to 16% of an electrically conductive material.

The type of gel in a gel battery containing a positive electrode of this invention is not critical. Any gelling agent, for example, polyacrylonitrile in an appropriate organic salt, can be used.

Other Battery Components

Negative electrode. The negative electrode of the battery of this invention may comprise any metal, carbon, or metal/carbon material capable of functioning as a negative electrode in combination with the novel metal-organosulfur positive electrode of this invention. The negative electrode may be comprised of many different metals. For example, any of the alkali or alkaline earth metals or transition metals can be used, and particularly mixtures containing lithium and/or sodium.

Preferred materials for said negative electrode include sodium and/or lithium, and mixtures of sodium or lithium with one or more additional alkali metals and/or alkaline earth metals. Preferred materials for said negative electrode also include mixtures of sodium or lithium with one or more elements to form a binary or ternary alloy, such as, $Na_4Pb$, lithium-silicon and lithium-aluminum alloys.

Particularly preferred negative electrode materials for the batteries of this invention include inserted carbon and/or a mixture of carbon with one or more additional alkali metals. Exemplary and preferred are $LiC_6$, and negative electrodes which comprise graphite or coke, for example, graphite intercalation compounds (GICs). Preferably the inserted carbon is that wherein some carbon has been replaced with boron, or wherein the carbon has been prepared from low temperature pyrolysis (about 750° C.) of carbon or carbon-silicon containing polymers such that the carbon product retains some hydrogen or silicon or both. [See, Sato et al , "A Mechanism of Lithium Storage in Disordered Carbons," *Science*, 264: 556 (22 Apr. 1994), which discusses very good results with a preferred negative electrode of Li inserted within PPP-based carbon. ]

A particularly preferred metal for a negative electrode, when a liquid electrode is desired, e.g., when a liquid positive electrode and a solid electrolyte are used, is sodium, or at least a sodium base alloy (i.e., at least 90% by weight sodium) because of its low equivalent weight and its relatively low melting point of 97.8° C. However, other alkali metals such as Li or K, or mixtures of same with Na may also be used, as desired, to optimize the overall system.

Electrolyte. Either or both the negative and positive electrodes may be in liquid, gel or solid form, and preferred electrolytes may vary accordingly. For example, either a liquid electrolyte or an elastomeric type/solid electrolyte may be used when both the positive and negative electrodes are in a solid form.

The novel metal/metal-organosulfur type cell of this invention may include an electrolyte to separate the metal-organosulfur positive electrode from the negative electrode. The electrolyte for solid-state formats functions as a separator for the positive and negative electrodes and as a transport medium for the metal ions. Thus, any solid material capable of transporting metal ions may be used.

Preferably such an electrolyte is a solid electrolyte, preferably a solid ceramic electrolyte and/or solid polymer electrolyte. Said solid ceramic electrolyte. preferably comprises a beta alumina material. The electrolyte may include sodium beta alumina or any suitable polymeric electrolyte, such as polyethers, polyimines, polythioethers, polyphosphazenes, polymer blends, and the like in which an appropriate electrolyte salt has been added. Preferred are such salts complexed with polyethylene oxide.

For liquid batteries, the salt for the electrolyte is in the solvent; whereas for a gel battery, it is in the solvent with a gelling agent; and for a solid-state battery, such a salt is in the polymer. Exemplary salts for electrolytes include, for example, $LiN(CF_3SO_2)_2$, lithium triflate ($LiCF_3SO_3$), lithium perchlorate ($LiClO_4$), $LiPF_6$, $LiBF_4$, and $LiAsF_6$.

The metal-organosulfur positive electrode material according to this invention can be immersed, for example, for a liquid battery format, in any conventional solvent. Preferred are aprotic solvents. A class of preferred aprotic solvents, include, among other related solvents, sulfolane, dimethyl sulfone, tetrahydrofuran, propylene carbonate, ethylene carbonate, dimethyl carbonate, butyrolactone, N-methylpyrrolidinone, tetramethylurea, glyme solvents, crown ethers and dimethoxyethane.

Operating Temperatures

The operating temperature of the novel battery cells of this invention is preferably 200° C. or below. A preferred operating temperature range is −40° C. to 145° C.; a more preferred range is from −20° C. to 100° C.; a still more preferred range is from −10° C. to 60° C.; and a still further preferred range is from −10° C. to 50° C. Most preferably for many applications, the cells of this invention operate at ambient or sub-ambient temperatures.

The high temperature range is limited by the melting point of either the electrode or the electrolyte. Sodium negative electrodes are limited to temperatures below 98° C., but sodium alloy electrodes, such as $Na_4Pb$, can be used at solid form at well over 100° C.

Energy density

The practical energy densities of the secondary cells of this invention are preferably greater than 65 watthours per kilogram (Wh/kg), more preferably greater than 75 Wh/kg, still more preferably greater than 90 Wh/kg, even more preferably greater than 100 Wh/kg, and still even more preferably greater than 120 Wh/kg. A preferred practical energy density range of the batteries of this invention is from 120 Wh/kg to 220 Wh/kg.

The following examples are illustrative and are not meant to limit the scope of the invention in any way.

$(n-C_4H_9)_4NBr$ in 15 ml of absolute ethanol was added. After standing for 6 hours with occasional stirring, the mixture was green throughout. It was filtered, and the precipitate washed with 2-propanol and ether and air dried. The solid was dissolved in 50 ml of warm acetone and filtered. The filtrate was concentrated to 5 ml under reduced pressure and 2-propanol was added to precipitate the complex. The mixture was cooled, filtered, washed, and dried as before. The crude material was recrystallized twice from 3:1 vol/vol ethanol-acetone and dried at 80° C. in vacuo to give 2.47 grams of $[(n-C_4H_9)_4N][Cu(tdt)_2]$ as lustrous dark green plates.

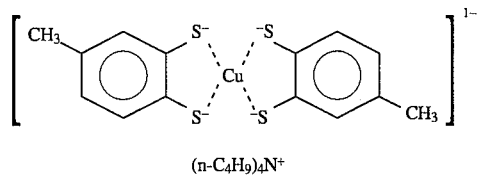

Several milligrams of the purified product were dissolved in acetone (0.1M tetraethyl ammonium and cyclic voltammograms were obtained versus a silver/silver oxide (Ag/AgO) reference and counter electrode. The cyclic voltammograms shown in FIG. 1 demonstrate the presence of two reversible electron transfer processes at approximately −1.3 volts and −0.6 volts versus Ag/AgO.

FIG. 2 provides a schematic of a Li/Celgard™/[Cu complex] cell. The copper complex of this example was dispersed on a graphite felt matrix and assembled into a lithium cell. The cycling performance of the lithium cell is exhibited in FIG. 3, wherein the cell is shown reversibly and reproducibly, with excellent utilization the total weight capacity. Although the equivalent of the bis-toluene-dithiol transition metal complexes are not as low as desired, the theoretical energy density still in the commercial realm. Table 1 below shows the equivalent weight and predicted practical energy density lithium cells based on the copper complex.

TABLE 1

| | | F.W. | E.W. | grams | Coulombs | mAh |
|---|---|---|---|---|---|---|
| 3,4-Dimercaptotoluene | DMT | 156.27 | | | | |
| Copper | Cu | 63.54 | | | | |
| TBA | $(n-C_4H_9)_4N^+$ | 242.00 | | | | |
| Cu Complex | $[(n-C_4H_9)_4N]Cu(DMT)_2$ | 618.08 | 309.04 | 0.01 | 3.12257313 | 0.867381425 |
| Cu Complex | $LiCu(DMT)_2$ | 383.08 | 191.54 | | | |
| | | T.E.D. (Wh/kg) 270.03 | P.E.D. (Wh/kg) 67.507 | | | |

EXAMPLE 1

Preparation of $[(n-C_4H_9)_4N][Cu(tdt)_2]$

To a solution of 1.25 grams of potassium metal in 30 ml of absolute ethanol was added 2,798 grams of toluene-3,4-dithiol (tdt) followed by 1.52 grams of $CuCl_2·2H_2O$ in 15 ml of absolute ethanol, as described by Williams et al., *J. Am. Chem. Soc.*, 88: 1 (Jan. 5, 1966). An intense red-brown color appeared immediately. A solution of 4.00 grams of Although TBA is used as an exemplary counter ion in this example, it is not a preferred major component of the positive electrodes of this invention. However, as indicated above it can be used as a dopant.

EXAMPLE 2

1,3,4,6-tetrathiapentalene-2,5-dione (TPD) was purchased from Aldrich Chemical Company, Inc. [Milwaukee, Wis. (USA)] and used as received. TPD was reacted with 4 mole equivalent of sodium methoxide in refluxing methanol for 2–3 hours as described by Vicente et al., Synthetic Metals 3: 265 (1986). To the resulting solution, 1 mole equivalent of Ni(acac)$_2$ was added, forming a solution of (NiC$_2$S$_4^{2-}$)$_n$. The solution was allowed to stand in the open atmosphere, with concomitant precipitation of a black powder. The black powder was washed with water, methanol, and acetone, and dried under vacuum. The resulting solid was ground, washed, and dried under vacuum.

Twenty-eight milligrams (7 mAh) of the dried [Na$_x$(NiC$_2$S$_4$)]$_n$ polymer was dispersed on a graphite felt electrode as shown in FIG. 2. A Celgard™ membrane was saturated with 1M LiN(SO$_2$CF$_3$)$_2$ in propylene carbonate. The cell exhibited reversible cycling at a current density of 150 µA/cm$^2$ as shown in FIG. 4. As described above and shown in Table 2 below, the theoretical energy density of this system is high. If more than a two electron redox process is feasible for this compound, the energy density will be correspondingly higher.

TABLE 2

| Tetrathioethylene | F.W. | E.W. | TED | PED |
|---|---|---|---|---|
| Nickel III | 58.7 | | | |
| C$_2$S$_4^{2-}$ | 152 | | | |
| NA$^+$ | 23 | | | |
| [Na$^+$(NiC$_2$S$_4$)]$_n$ | 233.7 | 116.85 | 541.0891 | 135.2723 |

EXAMPLE 3

Equimolar amounts of aqueous solutions of CuCl$_2$●xH$_2$O and the pyridinium salt of dimercaptothiadiazole were mixed resulting in the immediate precipitation of a red-brown polymer. The resulting polymer is most likely a copper thiadiazole coordination polymer as shown below,

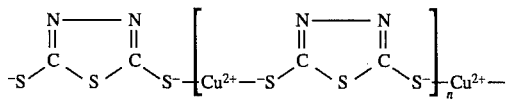

The red-brown polymer was filtered, washed with water and acetone, and dried under vacuum for several days. The copper complex was then dispersed on a graphite felt electrode as described in the previous examples, and tested in a lithium cell as shown in the above diagram. The copper thiadiazole complex exhibited reversible cycling between approximately 2 and 4 volts vs. lithium [discharge: 0.6 mA=0.6 mA/cm$^2$; charge: 0.3 mA=0.3 mA/cm$^2$].

EXAMPLE 4

Equimolar aqueous solutions of Fe(ClO$_4$)$_3$●xH$_2$O and the pyridinium salt of dimercaptothiadiazole were mixed resulting in the immediate precipitation of a yellow-green polymer. The iron thiadiazole complex was filtered, washed, and vacuum dried as described in the previous example. The complex was tested in a lithium cell as described in the previous example. The iron complex-exhibited reversible cycling between approximately 2 and 4 volts v. lithium.

EXAMPLE 5

Tetrasodium tetrathiobenzene and hexasodium hexathiobenzene can be obtained commercially from H. W. Sands Corporation, Hauppauge, New York (USA).

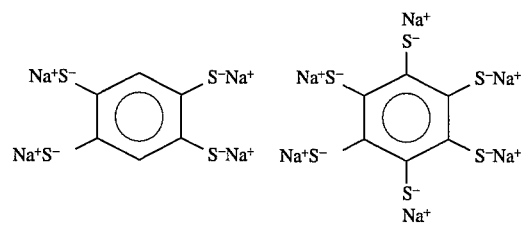

These salts can be complexed with transition metal salts to yield electronically conductive coordination polymers with multiple oxidation states, as described in the detailed description of the invention. For the case of the hexathiobenzene complexes, higher positive electrode capacities can be realized due to the presence of additional thiolate sites for the formation of disulfide bridges. Lithium batteries based on these complexes as positive electrode materials should have high energy density due to the low equivalent weight and high voltage of the metalthiolate complexes, and exhibit high power density due to the high electronic conductivity of the coordination polymers.

The foregoing describes the instant invention and its presently preferred embodiments. Numerous modifications and variations in the practice of this invention are expected to occur to those skilled in the art. Such modifications and variations are encompassed within the following claims.

All references cited herein are incorporated by reference.

We claim:

1. A battery cell comprising a positive electrode which comprises a metal-organosulfur material, wherein said metal-organosulfur material's organic group does not comprise fused aromatic rings;

wherein said metal-organosulfur material is characterized by one or more metal-sulfur bonds; and wherein when the positive electrode is charged and discharged, the metal's formal oxidation state is changed.

2. The battery cell of claim 1 which is further characterized by the metal-organosulfur material being polymeric and including sulfur atoms not directly linked to the metal of a polymeric repeat unit, and wherein upon charge and discharge of the positive electrode, sulfur-sulfur disulfide bridges are formed or broken intramolecularly and/or intermolecularly, wherein the intramolecular disulfide bridges do not form between the sulfurs of the metal-sulfur bonds.

3. A battery cell comprising a positive electrode which comprises a metal-organosulfur material having the general formula

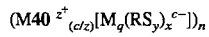

wherein z=1 or 2; y=1 to 20; x=1 to 10; c=0 to 10; n≧1;

and q=1 to 10;

wherein M' is a metal or other cation;

wherein M is any multivalent metal, and when n is>1, can be a different multivalent metal in different repeat units of the metal-organosulfur material;

wherein R is an organic group having 1 to 20 carbon atoms comprising one or more organic moieties selected from the group consisting of aliphatic chains, aromatic rings, alicyclic rings and combinations of aliphatic chains, aromatic rings, and alicyclic rings, providing that R does not comprise fused aromatic rings; wherein said aliphatic chains, aromatic and alicyclic rings may include one or more oxygen, sulfur, silicon, phosphorous or nitrogen heteroatoms, and may be substituted with one or more electron withdrawing groups; wherein each aliphatic chain may be linear or branched, saturated or unsaturated; and wherein when n>1, R can be different in different repeat units of the metal-organosulfur material.

4. The battery cell according to claim 3, wherein n is from 1 to 100,000;

wherein q is from 1 to 3;

wherein y is from 2 to 10;

wherein x is from 1 to 4;

wherein M' is selected from the group consisting of alkali metal cations and alkaline earth metal cations;

wherein M is selected from the group consisting of transition metals and alkaline earth metals; and wherein R contains from 2 to 12 carbons.

5. The battery cell according to claim 4, wherein n is from 2 to 5,000;

wherein y is from 2 to 8;

wherein M' is selected from the group consisting of alkali metal cations;

wherein M is selected from the group consisting of first row transition metals, Be and Mg; and wherein R contains from 2 to 8 carbons.

6. The battery cell according to claim 5, wherein n is from 4 to 50;

wherein y=4 to 8;

wherein M' is selected from the group consisting of $Li^+$, $K^+$ and Na+; and wherein M is selected from the group consisting of Mn, Fe, Co, Ni and Cu.

7. The battery cell according to claim 5, wherein one or more of the $(RS_y)$ groups is or are derived from the group consisting of tetrathioethylene, tetrathiobenzene, hexathiobenzene and cyclooctatetraenes substituted with from two to eight sulfurs; and wherein q=1.

8. The battery cell according to claim 7, wherein M' is $Li^+$ or $Na^+$;

wherein M is Fe, Mn or Cu in the repeat units of the polymeric metal-organosulfur materials wherein said selected Fe, Mn or Cu is in a weight percentage of from 98% to 100%, and wherein optionally M in some repeat units is another multivalent metal in a weight percentage of from 0% to 2%;

wherein x=1; and wherein $RS_y$ is derived from tetrathioethylene, tetrathiobenzene, hexathiobenzene, or a cyclooctatetraene substituted with from six to eight sulfurs.

9. The battery cell according to claim 3, wherein M' is selected from the group consisting of $Li^+$ and $Na^+$, and wherein when n>1, in some repeat units, M' is an optional dopant selected from the group consisting of tetra-alkyl ammonium cations and divalent metal cations; and wherein M is selected from the group consisting of Mn, Fe and Cu.

10. The battery cell according to claim 3, wherein the electron-withdrawing groups on R are selected from the group consisting of $NO_2$, $CF_3$, $SO_3$ and halogens.

11. A battery cell according to claim 3 in a liquid format.

12. The battery cell according to claim 11 comprising said metal-organosulfur material, optionally a binder and an electrically conductive additive;

wherein the percentage by volume of the metal-organosulfur material is from 60% to 95%;

wherein the percentage by volume of the binder is from 0% to 10%; and wherein the percentage by volume of the electrically conductive material is from 0% to 10%.

13. A battery cell according to claim 3 in a gel format.

14. The battery cell according to claim 13 comprising said metal-organosulfur material, a gel and optionally an electrically conductive material;

wherein the percentage by volume of the metal-organosulfur material is from 30% to 80%;

wherein the percentage by volume of the gel is from 10% to 50%; and wherein the percentage by volume of the electrically conductive material is from 0% to 20%.

15. A battery cell according to claim 3 in a solid-state format.

16. The battery cell according to claim 15 comprising said metal-organosulfur material, an electrolyte, and an electrically conductive material;

wherein the percentage by volume of the metal-organosulfur material is from 30% to 60%;

wherein the percentage by volume of the electrolyte is from 30% to 70%; and wherein the percentage by volume of the electrically conductive material is from 8% to 20%.

17. The battery cell according to claim 3 wherein the negative electrode comprises material selected from the group consisting of sodium, lithium, a mixture of sodium or lithium with one or more additional alkali metals, a mixture of sodium or lithium with one or more alkaline earth metals, a mixture of sodium or lithium with one or more alkali metals and one or more alkaline earth metals, and a mixture of sodium or lithium with one or more elements to form a binary or ternary alloy.

18. The battery cell according to claim 17 wherein said binary or ternary alloy is $Na_4Pb$, a lithium-silicon alloy or a lithium-aluminum alloy.

19. The battery cell according to claim 18 wherein said inserted carbon has some carbon replaced with boron, or wherein the carbon was prepared from low temperature pyrolysis of carbon or carbon-silicon containing polymers and retains either some hydrogen or some silicon or both.

20. The battery cell according to claim 3 wherein the negative electrode comprises inserted carbon and/or mixtures of carbon with one or more additional alkali metals.

* * * * *

UNITED STATES PATENT AND TRADEMARK OFFICE
CERTIFICATE OF CORRECTION

PATENT NO. : 5,516,598
DATED : May 14, 1996
INVENTOR(S) : Steven J. Visco

It is certified that error appears in the above-indentified patent and that said Letters Patent is hereby corrected as shown below:

Column 15, line 63, "2,798" should read -- 2.798 --.

Column 16, line 40, "density still in" should read -- density is still in --.

Column 17, Table 2, line 26, "NA$^+$" should read -- Na$^+$ --.

Column 18, Claim 3, line 50, "M40" should read -- M' --.

Column 19, Claim 6, line 31, "Na+" should read -- Na$^+$ --.

Signed and Sealed this

Nineteenth Day of November, 1996

Attest:

BRUCE LEHMAN

*Attesting Officer*  *Commissioner of Patents and Trademarks*